(12) United States Patent
Hallek

(10) Patent No.: US 9,514,645 B2
(45) Date of Patent: Dec. 6, 2016

(54) DRIVER ASSISTANCE DEVICE HAVING A PLURALITY OF ULTRASOUND SENSORS AND VEHICLE HAVING SUCH A DRIVER ASSISTANCE DEVICE AND METHOD FOR OPERATING A DRIVER ASSISTANCE DEVICE

(75) Inventor: Michael Hallek, Beilstein (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 288 days.

(21) Appl. No.: 14/119,572

(22) PCT Filed: May 25, 2012

(86) PCT No.: PCT/EP2012/059829
§ 371 (c)(1),
(2), (4) Date: Apr. 16, 2014

(87) PCT Pub. No.: WO2012/160192
PCT Pub. Date: Nov. 29, 2012

(65) Prior Publication Data
US 2014/0247161 A1    Sep. 4, 2014

(30) Foreign Application Priority Data
May 26, 2011   (DE) .......... 10 2011 102 557

(51) Int. Cl.
*B60Q 1/48* (2006.01)
*G08G 1/16* (2006.01)
(Continued)

(52) U.S. Cl.
CPC ................. *G08G 1/16* (2013.01); *G01S 7/524* (2013.01); *G01S 7/537* (2013.01); *G01S 15/878* (2013.01);
(Continued)

(58) Field of Classification Search
CPC .......... G08G 1/16; G08G 1/165; G08G 1/166; G01S 7/524; G01S 7/537; G01S 15/878; G01S 15/931
(Continued)

(56) References Cited

U.S. PATENT DOCUMENTS

2010/0182874 A1* 7/2010 Frank ...................... G01S 13/30
367/101

FOREIGN PATENT DOCUMENTS

CN   101375180 A   2/2009
CN   101598793 A   12/2009
(Continued)

OTHER PUBLICATIONS

International Search Report issued in PCT/EP2012/059829 mailed on Jul. 30, 2012 (2 pages).
(Continued)

*Primary Examiner* — Kerri McNally
(74) *Attorney, Agent, or Firm* — Osha Liang LLP

(57) ABSTRACT

The invention relates to a driver assistance device (2) having a plurality of ultrasound sensors, wherein at least one first ultrasound sensor (8 to 11, 17, 18, 21 to 24) has a normal mode as an operating mode in which transmitted ultrasound signals are unencoded and/or in which the first ultrasound sensor (8 to 11, 17, 18, 21 to 24) is designed for receiving unencoded ultrasound signals, and at least one second ultrasound sensor (6, 7, 13 to 16, 19, 20) can be operated in two different operating modes and has the normal mode as a first operating mode and has a special mode as a second operating mode, in which transmitted ultrasound signals are encoded and/or in which the second ultrasound sensor (6, 7, 13 to 16, 19, 20) is designed for receiving encoded ultrasound signals. The invention also relates to a vehicle (1)

(Continued)

having a driver assistance device (2) and a method for operating a driver assistance device (2).

17 Claims, 2 Drawing Sheets

(51) Int. Cl.
*G01S 7/524* (2006.01)
*G01S 15/93* (2006.01)
*G01S 15/87* (2006.01)
*G01S 7/537* (2006.01)
*G01S 15/10* (2006.01)
*G01S 15/32* (2006.01)

(52) U.S. Cl.
CPC ............ *G01S 15/931* (2013.01); *G08G 1/165* (2013.01); *G08G 1/166* (2013.01); *G08G 1/167* (2013.01); *G08G 1/168* (2013.01); *G01S 15/102* (2013.01); *G01S 15/325* (2013.01); *G01S 2015/938* (2013.01)

(58) Field of Classification Search
USPC ..................................................... 340/932.2
See application file for complete search history.

(56) References Cited

FOREIGN PATENT DOCUMENTS

| | | |
|---|---|---|
| CN | 101688914 A | 3/2010 |
| DE | 2607995 A1 | 9/1977 |
| DE | 101 06 142 A1 | 8/2002 |
| DE | 102 29 032 A1 | 1/2004 |
| DE | 10310214 A1 | 7/2004 |
| DE | 10361315 A1 | 7/2005 |
| DE | 102006037247 A1 | 2/2008 |
| DE | 10 2007 029959 A1 | 1/2009 |
| DE | 10 2008 002232 A1 | 12/2009 |
| DE | 102011086210 A1 | 5/2013 |

OTHER PUBLICATIONS

German Search Report issued in Application No. 10 2011 102 557.3 mailed on Sep. 14, 2011 (6 pages).
Office Action in corresponding Chinese Patent Application No. 201280035010.8 dated Nov. 4, 2014, with translation (19 pages).
Office Action in corresponding Chinese Patent Application No. 2012800350108 dated Apr. 22, 2015, with translation (15 pages).
German Search Report issued in corresponding German Patent Patent Application 102014107827.6 dated Nov. 14, 2014 (12 pages).

\* cited by examiner

DRIVER ASSISTANCE DEVICE HAVING A PLURALITY OF ULTRASOUND SENSORS AND VEHICLE HAVING SUCH A DRIVER ASSISTANCE DEVICE AND METHOD FOR OPERATING A DRIVER ASSISTANCE DEVICE

BACKGROUND

The invention relates to a driver assistance device having a plurality of ultrasound sensors. Moreover, the invention also relates to a vehicle having such a driver assistance device as well as a method for operating a driver assistance device.

A plurality of different driver assistance systems or driver assistance devices for motor vehicles is known. A number of such driver assistance devices operate on the basis of ultrasound sensors that are designed for detecting the surroundings of a vehicle. Specific actions are carried out depending on this information, which is detected by means of the ultrasound sensors, e.g. information is output to the driver of the vehicle and/or at least one semi-autonomous process is carried out for driving the vehicle by the driver assistance device.

With current parking assistance systems or parking assistance devices the distance between an object and the vehicle is determined using the transition time of previously transmitted ultrasound signals. An ultrasound sensor transmits a defined number of ultrasound signals, which in turn are received by one or a plurality of the ultrasound sensors. These are always the same ultrasound signals. It is therefore not possible for adjacent ultrasound sensors to transmit simultaneously, because the received ultrasound signals cannot otherwise be unambiguously assigned.

Moreover, a method of operating an ultrasound sensor array is known from DE 101 06 142 A1. Said array comprises at least two transmitting units distributed along the circumference of the motor vehicle for transmitting ultrasound pulses, and at least one receiving unit for receiving ultrasound pulses reflected at an object in the monitoring area. A plurality of transmitting units can be operated in parallel and at the same time transmit ultrasound pulses that are encoded relative to each other. For encoding, carrier signals of the ultrasound pulses are frequency modulated differently for the individual simultaneously operated transmitting units at least during the pulse period and the received encoded ultrasound pulses are assigned to individual simultaneously operated transmitting units by the at least one receiving unit using the encoding.

Regarding the encoding of ultrasound signals, a plurality of options and procedures are mentioned in said DE 101 06 142 A1. Besides frequency encoding, in which the frequency of the carrier signal of a first transmitting unit is upward modulated and the frequency of the carrier signal of a second transmitting unit is downward modulated, amplitude modulation can also be carried out over one or a plurality of pulses.

Such ultrasound sensors, which transmit encoded ultrasound signals, are however relatively expensive.

Moreover, it is not necessary for each function of a driver assistance system to transmit such encoded ultrasound signals, but conventional unencoded signals are also sufficient.

The object of the present invention is to provide a driver assistance device with whose ultrasound sensors high functionality in respect of safe and reliable detection of the surroundings is guaranteed and which can be implemented inexpensively.

This object is achieved by a driver assistance device, a vehicle having such a driver assistance device and a method for operating such a driver assistance device according to the independent claims.

SUMMARY OF INVENTION

A driver assistance device according to the invention comprises a plurality of ultrasound sensors. At least one first ultrasound sensor has a normal mode as an operating mode, in which ultrasound signals transmitted by said first ultrasound sensor are unencoded. Said first ultrasound sensor can especially only be operated in said one single operating mode. The driver assistance device comprises at least one second ultrasound sensor, which can be operated in two different operating modes. Said second ultrasound sensor can be operated according to the normal mode in a first operating mode or has said normal mode as a first operating mode. Said normal mode corresponds to the normal mode of the first ultrasound sensor. As a second operating mode, said second ultrasound sensor has a special mode in which the ultrasound signals transmitted by said second ultrasound sensor are encoded. In addition to or instead of this, said second ultrasound sensor is designed such that it is configured for receiving encoded ultrasound signals in the special mode. By such an embodiment of the driver assistance device, a high functionality system can be provided, which can still be implemented very inexpensively in regards to its fitting with the ultrasound sensors. In particular, the combination of ultrasound sensors that are designed with a different number of possible operating modes enables a versatile implementation of operating modes.

In said first normal mode the two ultrasound sensors are designed for sending and receiving unencoded ultrasound signals. In this context cross-wise operation is possible. This means that the first ultrasound sensor can transmit an unencoded ultrasound signal, which can be received by the second ultrasound sensor if this is being operated in the normal mode. In particular it is also conversely possible that the second ultrasound sensor transmits an unencoded ultrasound signal in the normal operating mode that among other things can also be received by the first ultrasound sensor.

In particular in said normal mode both ultrasound sensors do not transmit simultaneously.

On the other hand it is also possible, however, that the second ultrasound sensor is operated in the special mode, and then transmits encoded ultrasound signals that it can then also receive again. Such encoded ultrasound signals are then not received by the first ultrasound sensor.

It is preferably provided that the operation of the second ultrasound sensor in the normal mode or in the special mode is dependent on a value of a vehicle parameter and/or on a function of the driver assistance device.

The operation of the ultrasound sensors is especially controlled by a control unit of the driver assistance device. This can carry information from other sensors of the vehicle that records values of vehicle parameters. Thus in this respect corresponding, very accurate and timely active operation of an ultrasound sensor can also take place and the normal mode or the special mode of the second ultrasound sensor can be activated very much according to need and situation-specifically. The information generation of the plurality of ultrasound sensors can thus take place very much according to need and situation-specifically. The operation of the driver assistance device can thus be made accurate and improved.

It is preferably provided that the vehicle parameter is the speed of the vehicle. Directly dependent thereon, highly targeted information generation regarding a specific function of the driver assistance device using the ultrasound sensors can also be enabled.

The driver assistance device can be designed as a parking assistance device and/or as a blind spot monitoring device and/or as a braking assistance device and/or as a distance monitoring device (ACC=Adaptive Cruise Control) and/or as an accident early detection device (pre-crash device). In addition to or instead of this a parking space measuring function and thus a parking space measuring device can also be added.

The driver assistance device can have one or a plurality of said functions.

Then if the at least one first ultrasound sensor is in active operation and is transmitting unencoded ultrasound signals, simultaneous transmission of ultrasound signals can take place if the second ultrasound sensor is active in the special mode.

It is preferably provided that the first and/or the second ultrasound sensor is/are operated in the active mode depending on the currently active function of the driver assistance device. Especially controlled by the control unit, the number and also the type of ultrasound sensors can be selected very much according to need and a respective active mode can thus take place which is highly dependent on need and dependent on the respective function of the driver assistance device that is to be performed. The above-mentioned advantages are further supported in this way. It is preferably provided that the ultrasound sensors are designed for crosswise reception of the ultrasound signals transmitted by the respective other ultrasound sensor in normal mode.

It is particularly advantageous that the second ultrasound sensor can be changed over in active operation, especially alternatingly, between the normal mode and the special mode for information generation for a function of the driver assistance device. The option is not only provided that if the driver assistance device is operated to perform a specific function, e.g. of blind spot monitoring or of brake assistant or of distance monitoring or of parking space measurement or of a parking process or of an unparking process, then the second ultrasound sensor can only be operated in normal mode or in special mode, but that also during active operation of a driver assistance device for performing a function the operating mode of the second ultrasound sensor can be changed, especially can be changed at least once. In both operating modes information is then generated that is taken into account for performing said specific function of the driver assistance device. In particular, indirect measurements between at least one second ultrasound sensor and one first ultrasound sensor are possible if both ultrasound sensors are operated in normal mode. In particular, the functions of a parking aid can thus be implemented with a mixed mode of the two sensors.

In particular, amending a first ultrasound sensor to have the functionality of a second ultrasound sensor is also possible. This can e.g. take place by means of a software upgrade and/or by means of specific control of a first ultrasound sensor by the control unit, so that this can also be operated as a second ultrasound sensor.

Lower noise immunity is provided in the normal mode, but operating in normal mode is possible using indirect signal paths between two types of sensor, the first ultrasound sensor on the one hand and the second ultrasound sensor on the other hand.

The invention also relates to a vehicle having a driver assistance device according to the invention or an advantageous embodiment thereof. It is preferably provided that the position of the at least one second ultrasound sensor on the vehicle and/or the number of second ultrasound sensors is dependent on the function of the driver assistance device. If in particular one driver assistance device is provided that is only provided for a single function and is installed in the vehicle, then the required number of second ultrasound sensors can already be provided during fitting of the driver assistance device and can be installed in suitable positions. A particularly optimized system in terms of high functionality and cost minimization is thus achieved.

It can however also be provided that the driver assistance device is designed for performing at least two different functions, which e.g. can also at least at times be simultaneously monitored and carried out if the vehicle is in operation. Depending on how many and/or at which position ultrasonic sensor(s) is/are necessary, suitable attachment to the vehicle can take place. In particular here, fitting with ultrasound sensors can also be provided, whereby at least one first ultrasound sensor and/or at least one second ultrasound sensor are considered for generating information for at least both functions of the driver assistance device.

If in particular second ultrasound sensors for the functions to be fulfilled of the driver assistance device are necessary at different positions of the vehicle, then this can be suitably carried out.

In particular, however, only the minimal number of second ultrasound sensors is installed to enable the driver assistance device functions that are to be performed to be guaranteed.

It is preferably provided that the driver assistance device has the blind spot monitoring function and a parking space measurement function, and at least two second ultrasound sensors are formed or disposed in a rear area of the vehicle. In particular it is provided that at relatively high speeds of the vehicle only said two second ultrasound sensors are operated and are especially operated in special mode in this case. The blind spot monitoring can be particularly efficient and accurate here.

In particular at low speeds of the vehicle, especially for performing parking space measurement, the two second ultrasound sensors are operated in the normal mode, so that indirect measurements of the different types of sensor are also possible.

It is preferably provided that for such functionality of the driver assistance device as regards the blind spot monitoring and the parking space measurement, at least one first ultrasound sensor, preferably two first ultrasound sensors, is or are disposed between the two second ultrasound sensors when looking in the circumferential direction of the vehicle. In particular it is provided that looking towards the long sides of the vehicle in the peripheral direction of the vehicle at least one other first ultrasound sensor is disposed in each case adjacent to a second ultrasound sensor. An arrangement of four first ultrasound sensors and two second ultrasound sensors is preferably provided in the rear area with such an embodiment of a driver assistance device having the functionality of blind spot monitoring and parking space measurement.

In another embodiment of the driver assistance device it can be provided on the vehicle that at least two second ultrasound sensors are disposed in a frontal area of the vehicle. In particular said two second ultrasound sensors are advantageously disposed centrally in the frontal area. Said positioning and the number of second ultrasound sensors in the frontal area enable very different embodiments of driver assistance devices as regards their functionality. In particular it is thereby possible that the function of a brake assistant and/or of distance monitoring and/or of parking assistant for parking and/or unparking of a vehicle into or out of a parking space is guaranteed.

In particular it is advantageously provided that the driver assistance device has the functions of braking assistance and parking assistance, and in the frontal area four second ultrasound sensors are disposed adjacent to each other. In particular it is provided that a first ultrasound sensor is disposed adjoining in each case said four second ultrasound sensors in the circumferential direction of the vehicle on the longitudinal sides of the vehicle. In particular a sensor arrangement having six sensors is thereby provided in the frontal area of the vehicle.

For operation of the driver assistance device, which has the functions of braking assistance and of parking assistance, either the two central second ultrasound sensors or even all four second ultrasound sensors are used. The two first ultrasound sensors are used among other things for the parking space measurement function. For a parking space measurement it is then especially provided that the outer two second ultrasound sensors are operated in normal mode in order to also be able to receive the ultrasound signals of the first ultrasound sensors.

In another advantageous embodiment of the driver assistance device it has the functions of distance monitoring and of parking space measurement of the parking assistance function. In particular, with such a functional relationship to the driver assistance device it is provided that adjacent to the two second ultrasound sensors centrally positioned in the frontal area, two first ultrasound sensors are respectively formed in the circumferential direction of the vehicle on the outside adjoining the second ultrasound sensors. With said sensor configuration it is then provided that again six sensors are disposed in the frontal area, of which four are first ultrasound sensors and two are second ultrasound sensors. For the operation of the driver assistance device regarding the distance monitoring function it is then sufficient that only the second ultrasound sensors are actively operated and in particular are operated in the special mode. If the vehicle is to be parked in a parking space that is also to be previously located and measured, then it is provided that all first and second ultrasound sensors are operated in the normal mode.

In particular, this means that indirect signal paths must be possible between inner and outer sensors for a parking process, which means that receiving and sending of the unencoded ultrasound signals must be provided.

Moreover, the invention relates to a method for operating a driver assistance device having a plurality of ultrasound sensors. It is provided that at least one first ultrasound sensor has a normal mode as an operating mode in which ultrasound signals are transmitted unencoded. At least one second ultrasound sensor can be operated in two different operating modes, wherein the normal mode is provided as a first operating mode and a special mode can be performed as a second operating mode, in which ultrasound signals can be transmitted encoded and encoded ultrasound signals can be received.

Advantageous embodiments of the driver assistance device according to the invention are to be considered as advantageous embodiments of the method according to the invention. In particular, the corresponding steps of the method can be performed by the control unit of the driver assistance device and/or the ultrasound sensors.

Other features of the invention arise from the claims, the figures and the description of the figures. The features and combinations of features previously mentioned in the description and also the features and combinations of features only shown in the figures and/or the features and combinations of features only mentioned in the description of the figures can not only be used in the respectively specified combination, but also in other combinations or on their own, without departing from the scope of the invention.

Exemplary embodiments of the invention are explained in detail below using schematic figures. In the figures:

DETAILED DESCRIPTION

Figure 1:
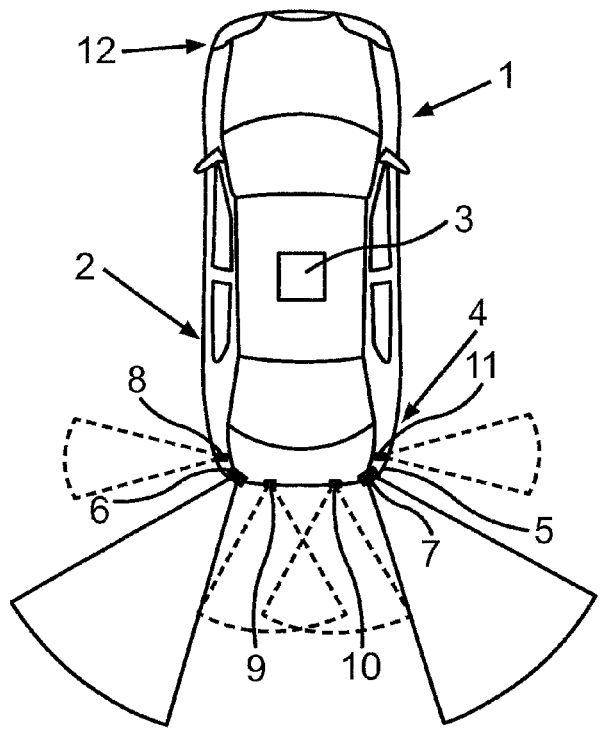
FIG. 1 shows a plan view of a first exemplary embodiment of a vehicle according to the invention having a first exemplary embodiment of a driver assistance device according to the invention.

In the figures the same or functionally equivalent elements are provided with the same reference characters.

In FIG. 1 a vehicle 1 is shown in a plan view, being a passenger car. The vehicle 1 comprises a driver assistance device 2, which in the exemplary embodiment comprises blind spot monitoring and parking space measurement functions.

The driver assistance device 2 comprises a control unit 3. It also comprises a plurality of ultrasound sensors in a rear area 4 of the vehicle 1. In the exemplary embodiment the ultrasound sensors are disposed in a bumper 5. The surrounding area of the vehicle 1 in the rear area 4 is detected by means of the ultrasound sensors 6, 7, 8, 9, 10 and 11.

The vehicle 1 can, moreover, also comprise other ultrasound sensors in a frontal area 12. These can also be associated with the driver assistance device 2. Said plurality of ultrasound sensors disposed in the frontal area 12 can in particular also be used for generating information about the surrounding area and especially for parking space measurement.

The control unit 3 can, moreover, also be designed for processing signals of other sensors of the vehicle. In particular, information about the speed of the vehicle 1 and/or a yaw angle and/or a steering angle and similar can be provided. The vehicle parameters mentioned are here not to be considered as comprehensive.

The six ultrasound sensors 6 to 11 disposed in the rear area 4 are of different design in respect of the type of sensor. In the exemplary embodiment it is provided that the two ultrasound sensors 6 and 7 are designed as second ultrasound sensors, which can be operated in two different operating modes. Said second ultrasound sensors 6 and 7 are disposed on the corners of the rear area 4. They can be operated in a normal mode, in which they can transmit unencoded ultrasound signals and can receive unencoded ultrasound signals. The reception of self-transmitted ultrasound signals can thus take place and receiving ultrasound signals from at least one of the other ultrasound sensors, such as those shown, can also take place. They can also be operated in a special mode in which they transmit encoded signals and can only receive these again.

The other four ultrasound sensors 8 to 11 are first ultrasound sensors, which can only be operated in a single operating mode, i.e. the normal mode. They can also only transmit unencoded ultrasound signals and receive unencoded ultrasound signals.

If blind spot monitoring is now to be carried out with the driver assistance device 2, then only the two second ultrasound sensors 6 and 7 are operated in the active mode and thereby transmit the encoded ultrasound signals and can then also only receive their own encoded ultrasound signals again. In particular, this mode is automatically set up by the control unit 3, wherein this especially takes place depending on the speed of the vehicle.

If on the other hand a parking space is to be sought and a corresponding parking space is to be measured, then all six sensors 6 to 11 are operated in normal mode and all six sensors 6 to 11 transmit unencoded ultrasound signals. In this mode the ultrasound sensors 6 to 11 transmit ultrasound signals with time offsets.

This can be different in the previously mentioned mode in which the two ultrasound sensors 6 and 7 are operated in the special mode and transmit encoded signals. In this state the two sensors 6 and 7 transmit their encoded ultrasound signals simultaneously.

Figure 2:
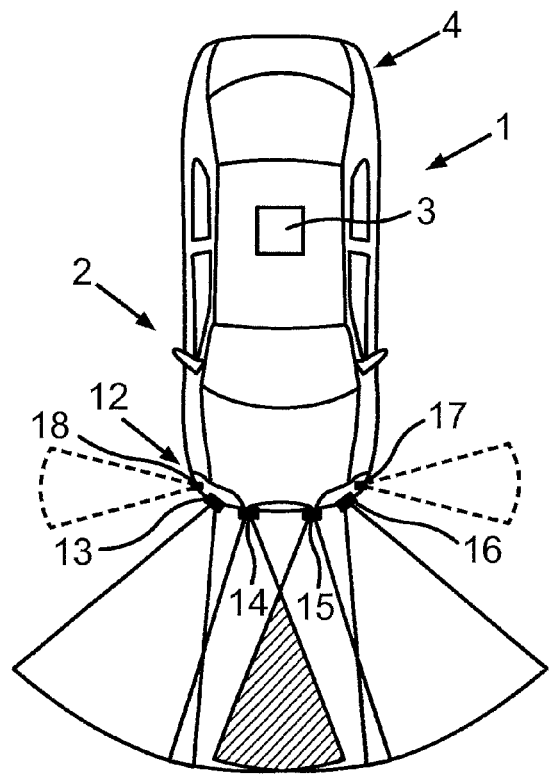
FIG. 2 shows a plan view of another exemplary embodiment of a vehicle according to the invention having an exemplary embodiment of a driver assistance device according to the invention.

Another exemplary embodiment of a vehicle 1 is shown in a plan view representation in FIG. 2. The driver assistance device 2 is designed here at least for performing the functions of a braking assistant and a parking assistant. For performing said functions it is provided that six ultrasound sensors 13, 14, 15, 16, 17 and 18 are formed in the frontal area 12 of the vehicle 1. With said embodiment here too the ultrasound sensors 13 to 18 are formed in a bumper of the vehicle 1. It can be seen that the four centrally disposed ultrasound sensors 13 to 16 are second ultrasound sensors, which can be operated both in a normal mode and also in a special mode.

The two outer ultrasound sensors 17 and 18 are first ultrasound sensors, which can only be operated in a normal mode.

If the function of the braking assistant is now to be monitored and carried out, then it can be provided that the two central second sensors 14 and 15 are actively operated and the remaining four ultrasound sensors are not. Said two second ultrasound sensors 14 and 15 are then operated in the special mode, in which they can only transmit and receive encoded ultrasound signals.

For performing the braking assistance function it can also be provided that all four second ultrasound sensors 13 to 16 are actively operated and are operated in the special mode. The two first ultrasound sensors 17 and 18 are not required for the braking assistant function and are therefore not operated.

If on the other hand a parking space measurement is to be carried out and then a parking process is to take place, then all sensors 13 to 18 are operated in the normal mode, in which they can transmit and receive unencoded ultrasound signals. Information from ultrasound sensors disposed in the rear area 4 of the vehicle 1 can then also be considered, as in particular for parking space measurement and also for performing a parking process.

Figure 3:
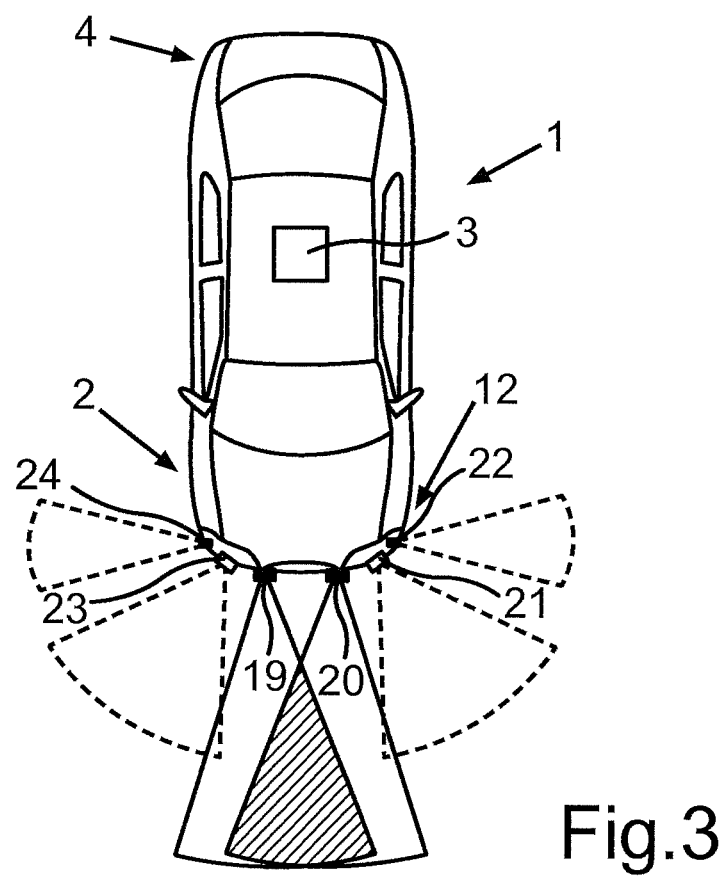
FIG. 3 shows a plan view of another exemplary embodiment of a vehicle according to the invention having an exemplary embodiment of a driver assistance device according to the invention.

A vehicle 1 is shown in another plan view representation in FIG. 3, the vehicle comprising the driver assistance device 2, wherein with this embodiment the driver assistance device 2 is designed at least for performing the functions of distance monitoring and parking space measurement and an at least semi-autonomous parking process. With this embodiment six ultrasound sensors are again provided in the frontal area 12 of the vehicle 1, wherein two second ultrasound sensors 19 and 20 are formed centrally. Four first ultrasound sensors 21, 22, 23 and 24 are formed in the circumferential direction of the vehicle 1 towards the outside and adjoining the two second ultrasound sensors 19 and 20. Here too the two second ultrasound sensors 19 and 20 can be operated in the normal mode and in the special mode, whereas the four first ultrasound sensors 21 to 24 can only be operated in the normal mode.

For the distance monitoring it is sufficient if the two second ultrasound sensors 19 and 20 are operated and transmit and receive unencoded ultrasound signals in the special mode.

If the parking space measurement function and/or a parking process are to be carried out, then all six sensors 19 to 24 are operated in the normal mode and only unencoded ultrasound signals are transmitted and correspondingly received.

Here too it is provided that other ultrasound sensors are disposed in the rear area 4 of the vehicle to provide information especially for consideration during the parking space measurement function and/or when performing the parking process.

With all embodiments the cone shown in front of the ultrasound sensors indicates detection areas, which however are only to be understood to be schematic and sketched.

It can also be provided that at least some ultrasound sensors of an exemplary embodiment for an embodiment of a driver assistance device 2 are also present in a different exemplary embodiment, so that a functional expansion of the driver assistance device may be formed.

It can also be provided that at least some of the second ultrasound sensors, as was explained in the exemplary embodiments, can be switched back and forth between a normal mode and a special mode during active operation for supporting a function of a driver assistance device 2.

As explained in the exemplary embodiments, arrangements of ultrasound sensors are thus enabled that enable a highly cost-reduced embodiment because ultrasound sensors that can be operated in two modes are only necessary at specific positions and only for certain applications.

The invention claimed is:

1. A driver assistance device comprising:
a plurality of ultrasound sensors, wherein
at least one first ultrasound sensor has only a normal mode as an operating mode, wherein, in the normal mode, unencoded ultrasound signals are transmitted and received, and
at least one second ultrasound sensor is operable in two different operating modes comprising the normal mode as a first operating mode, and a special mode as a second operating mode, wherein, in the special mode, encoded ultrasound signals are transmitted and received.

2. The driver assistance device according to claim 1, wherein the operation of the second ultrasound sensor in the normal mode or in the special mode is dependent on a value of a vehicle parameter and a function of the driver assistance device.

3. The driver assistance device according to claim 2, wherein the vehicle parameter is the speed of the vehicle.

4. The driver assistance device according to claim 2, wherein the driver assistance device is at least one selected from the group selected from a parking assistance device, a blind spot monitoring device, a braking assistance device, a distance monitoring device and an accident early detection device.

5. The driver assistance device according to claim 1, wherein depending on a currently active function of the driver assistance device, the first and/or the second ultrasound sensor is/are operated in an active mode.

6. The driver assistance device according to claim 1, wherein the ultrasound sensors are designed for cross-wise reception of the ultrasound signals transmitted by the respective other ultrasound sensor in the normal mode.

7. The driver assistance device according to claim 1, wherein the second ultrasound sensor is designed to be changed over in an active mode between the normal mode and the special mode, alternatingly, for generating information for a function of the driver assistance device.

8. A vehicle having a driver assistance device according to claim 1.

9. The vehicle according to claim 8, wherein the position of the at least one second ultrasound sensor on the vehicle and/or the number of second ultrasound sensors is/are dependent on a function of the driver assistance device.

10. The vehicle according to claim 9, wherein the driver assistance device has the function of blind spot monitoring and of parking space measurement, and at least two of the second ultrasound sensors are formed in a rear area of the vehicle.

11. The vehicle according to claim 10, wherein the at least one first ultrasound sensor is disposed between the two second ultrasound sensors looking in the circumferential direction of the vehicle and at least one further first ultrasound sensor is disposed adjacent to each second ultrasound sensor, towards the longitudinal sides of the vehicle.

12. The vehicle according to claim 9, wherein the at least two of the second ultrasound sensors are disposed centrally in a frontal area of the vehicle.

13. The vehicle according to claim 12, wherein:
the driver assistance device has a braking assistance function and a parking assistance function,
four of the second ultrasound sensors are disposed adjacent to each other in the frontal area, and
the at least one first ultrasound sensor is disposed adjoining each second ultrasound sensor, towards the longitudinal sides of the vehicle in the circumferential direction of the vehicle.

14. The vehicle according to claim 12, wherein:
the driver assistance device has a distance monitoring function and a parking space measurement function, and a parking assistance function,
two of the first ultrasound sensors are formed adjacent to the at least two of the second ultrasound sensors positioned centrally in the frontal area so as to adjoin each of the second ultrasound sensors in the circumferential direction of the vehicle.

15. A method for operating a driver assistance device, the method comprising:
operating at least one first ultrasound sensor in a normal mode only, wherein, in the normal mode, unencoded ultrasound signals are transmitted and received;
operating at least one second ultrasound sensor in the normal mode when the at least one second ultrasound sensor is not operating in a special mode, and operating the at least one second ultrasound sensor in the special mode when the at least one second ultrasound sensor is not operating in the normal mode, wherein, in the special mode, encoded ultrasound signals are transmitted and received;
performing the normal mode as a first operating mode for the at least one second ultrasound sensor; and
performing the special mode as a second operating mode for the at least one second ultrasound sensor.

16. The driver assistance device according to claim 1, wherein the operation of the second ultrasound sensor in the normal mode or in the special mode is dependent on a value of a vehicle parameter.

17. The driver assistance device according to claim 1, wherein the operation of the second ultrasound sensor in the normal mode or in the special mode is dependent on a function of the driver assistance device.

* * * * *